US009736847B2

United States Patent
Feng et al.

(10) Patent No.: US 9,736,847 B2
(45) Date of Patent: Aug. 15, 2017

(54) FAST ACCESS IN V2V COMMUNICATION SERVICES BY DYNAMIC RESOURCES ALLOCATION

(75) Inventors: Xianjun Feng, Shanghai (CN); Haifeng Wang, Shanghai (CN); Zhenhong Li, Shanghai (CN); Wei Zou, Shanghai (CN); Kenan Xu, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/415,962

(22) PCT Filed: Jul. 20, 2012

(86) PCT No.: PCT/CN2012/078922
§ 371 (c)(1),
(2), (4) Date: Jan. 20, 2015

(87) PCT Pub. No.: WO2014/012244
PCT Pub. Date: Jan. 23, 2014

(65) Prior Publication Data
US 2015/0195827 A1 Jul. 9, 2015

(51) Int. Cl.
*H04W 72/04* (2009.01)
*H04W 4/20* (2009.01)
(Continued)

(52) U.S. Cl.
CPC ....... *H04W 72/048* (2013.01); *H04L 63/0428* (2013.01); *H04W 4/206* (2013.01);
(Continued)

(58) Field of Classification Search
CPC ..... H04W 12/04; H04L 63/04; H04L 63/0428
See application file for complete search history.

(56) References Cited

U.S. PATENT DOCUMENTS 7,471,669 B1 * 12/2008 Sabesan ............... H04L 45/02
370/351
8,005,052 B2 8/2011 Hayashi et al.
(Continued)

FOREIGN PATENT DOCUMENTS

CN 101636933 A 1/2010
CN 102448180 A 5/2012
(Continued)

OTHER PUBLICATIONS

International Search Report issued Apr. 25, 2013 in PCT/CN2012/078922 Filed Jul. 20, 2012.

*Primary Examiner* — Saleh Najjar
*Assistant Examiner* — Devin Almeida
(74) *Attorney, Agent, or Firm* — Oblon, McClelland, Maier & Neustadt, L.L.P.

(57) ABSTRACT

It is provided a method, comprising assigning a first direct resource of a radio interface to a first vehicle-to-vehicle service based on a resource information received from a base station in a cellular mode via a cellular resource of the radio interface, wherein, in the resource information, the first direct resource and the first vehicle-to-vehicle service are indicated as being correlated, and the first vehicle-to-vehicle service is to be used or to be provided by at least a first one of one or more vehicle devices, and wherein, in the cellular mode, a communication of an apparatus performing the method with each of the one or more vehicle devices different from the apparatus is performed via the base station; performing the first vehicle-to-vehicle service via the first direct resource in a vehicle-to-vehicle mode, wherein, in the vehicle-to-vehicle mode, the communication of the apparatus with each of the one or more vehicle devices is performed directly with the respective vehicle device and does not involve the base station.

20 Claims, 8 Drawing Sheets

(51) Int. Cl.
  *H04W 76/02* (2009.01)
  *H04L 29/06* (2006.01)
  *H04W 72/10* (2009.01)
  H04W 4/06 (2009.01)
  H04W 4/22 (2009.01)
  H04W 12/04 (2009.01)
  H04W 88/10 (2009.01)
  H04W 4/04 (2009.01)

(52) U.S. Cl.
  CPC ....... *H04W 72/0486* (2013.01); *H04W 72/10* (2013.01); *H04W 76/023* (2013.01); *H04W 4/046* (2013.01); *H04W 4/06* (2013.01); *H04W 4/22* (2013.01); *H04W 12/04* (2013.01); *H04W 88/10* (2013.01)

(56) References Cited

U.S. PATENT DOCUMENTS

| | | | |
|---|---|---|---|
| 8,923,147 B2 * | 12/2014 | Krishnaswamy | G08G 1/093 370/252 |
| 8,971,790 B2 * | 3/2015 | Agashe | H04H 20/26 348/734 |
| 2009/0296680 A1 | 12/2009 | Suzuki et al. | |
| 2012/0087292 A1 | 4/2012 | Grimm et al. | |

FOREIGN PATENT DOCUMENTS

| | | |
|---|---|---|
| JP | 2006-261742 A | 9/2006 |
| JP | 2010-252137 A | 11/2010 |

* cited by examiner

For 'Fast brake' messages
For 'slow down' messages
For 'turn to other direction' messages

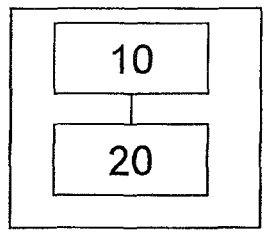
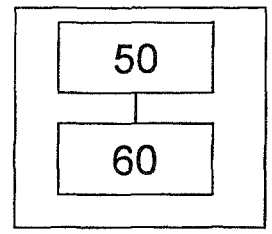
Fig. 10         Fig. 12
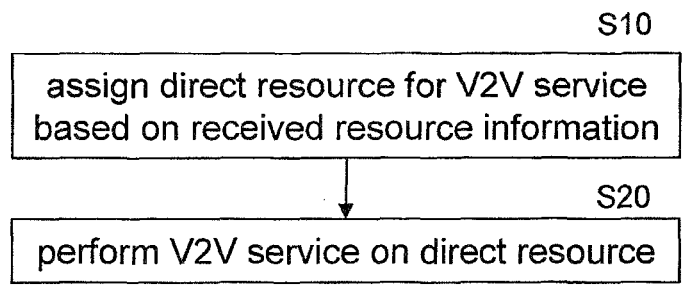
Fig. 11
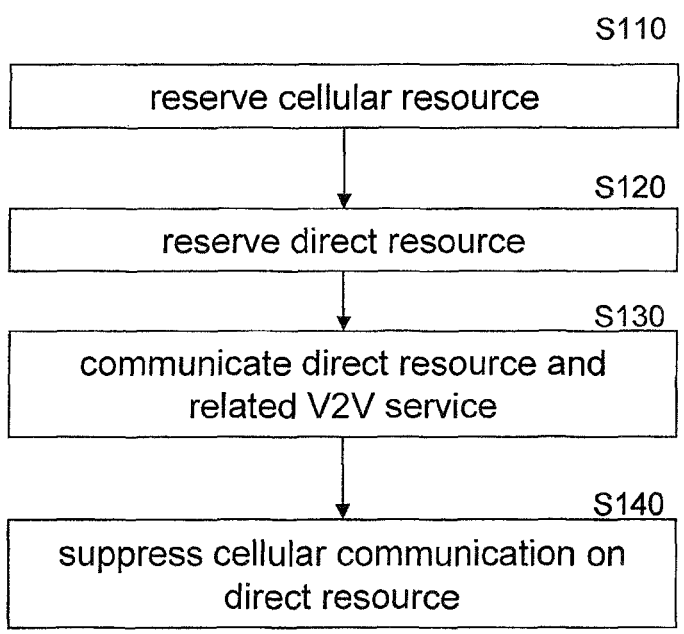
Fig. 13

FAST ACCESS IN V2V COMMUNICATION SERVICES BY DYNAMIC RESOURCES ALLOCATION

FIELD OF THE INVENTION

The present invention relates to an apparatus, a method, and a computer program product for vehicle to vehicle communication. More particularly, the present invention relates to an apparatus, a method, and a computer program product for vehicle communication based on a cellular network resource.

BACKGROUND OF THE INVENTION

Abbreviations eNB Enhanced NodeB
UE User Equipment
LTE™ Long Term Evolution
E-UTRA Evolved Universal Terrestrial Radio Access
MME Mobility Management Entity
LA Local Area
IE Information Element
3GPP $3^{rd}$ Generation Partnership Project
4G $4^{th}$ Generation
TS Technical Specification
Rel Release
D2D Device to Device
LAB Local Area Broadcasting
LAS Local Area Service
LTE Long Term Evolution
V2V Vehicle to Vehicle
WAVE Wireless Access System in Vehicular Environment
WSM WAVE Short Message
CCH Control Channel
SCH Service Channel
IP Internet Protocol
ID Identifier
IEEE Institute of Electrical and Electronics Engineers
QoS Quality of Service
ACK Acknowledge
CSMA Carrier Sense Multiple Access
PUBCH Physical Urgent Broadcasting Channel
PRACH Physical Random Access Channel
SIB System Information Block
RRC Radio Resource Control
USIM Universal Subscriber Identity Module As an indispensible part of vehicle communication, vehicle-to-vehicle (V2V) communication plays an important role in the future intelligent transportation system.

V2V communication enables many applications and services such as intersection collision warning and co-operative adaptive cruise control. These services usually require fast session setup and multiple radio links simultaneously in order to monitor the complicated surroundings, especially when involved with safety related applications.

Being widely accepted, IEEE 1609 series standards define a wireless access system in vehicular environment (WAVE) intended to provide seamless, interoperable services to transportation. An obvious difference from other communication standards is that it builds up a communication mechanism based on services.

In IEEE 1609 standards, a WAVE device advertises its service on the control channel (CCH) as a service provider. Other WAVE devices interested in its service can monitor the CCH to involve in the service on a service channel (SCH) as service users. In addition, the standard provides a new message mechanism, WAVE short message (WSM), to expedite the service session setup.

Although WAVE standard has defined a complete V2V communication system, it also has its own shortages. For example, the specified local-area communication and ad hoc-like networking cannot support infotainment application effectively due to the lack of infrastructure. Also, for safety applications like collision warning, the urgent message must be delivered in a very short time. However, WAVE standard may cause too large delay for some urgent message due to CSMA/CA transmission rule and possible collisions, even when the priority of that message is the highest [2].

For example, when a vehicle has an urgent message to send while the channel is not idle at that time due to one other's transmission, that vehicle has to wait until the channel is free again. In WAVE, all vehicles are required to monitor control channel (CCH) in the 50 ms CCH interval, and may transfer to some other service channel (SCH) in the next 50 ms SCH interval. Hence, an urgent message that needs to be transmitted in CCH may have to wait 50 ms before it can be transmitted. This is a too-large delay compared with the required 10 ms/20 ms latency for urgent events as listed in [3].

Although IEEE 1609 standards have been finalized for years, the practical market penetration of these standards in automotive transportation infrastructure industries is far less than what had been expected. A main reason lies in the imposing challenges to build a ubiquitous WAVE network, which needs a large amount of capital investments.

On the other hand, cellular network has been in operation for a long time as a ubiquitous network. 3GPP aims to bring the cellular technology to more fields of applications and services. In the past several years, 4G LTE device to device (D2D) communication technology has been a hot topic in cellular field. However, applying D2D technology into vehicular communication is rarely addressed.

V2V communication is a kind of D2D communication, particularly adapted for the needs of communication between vehicles, which may move fast on the roads. Due to the stringent latency requirement in many V2V communication applications, the existing D2D technologies designed for low mobility and static conditions are not applicable directly. In this application, the term vehicle is used in order to represent at least a terminal attached to or installed in a vehicle.

When LTE D2D technology is used for V2V communication services in local area, several significant benefits can be achieved, including Vehicles can access the LTE network in an ubiquitous manner;
Vehicle communication and non-vehicle communication can share the same resources, e.g. air interface, frequency band;
ENodeB can effectively control the vehicles between V2V mode and cellular mode to improve resources utilization efficiency, e.g. saving energy.

However, the existing methods for D2D session setup consist of a series of complicated procedures, including ENodeB allocates and configures the resources for D2D communication;
D2D devices measure the channel quality between devices;
ENodeB or other network elements determine the initiation of D2D communication.

These complicated procedures result in excessive D2D communication latency. However, V2V communication instances are usually triggered by emergency events. The event-triggered message transmission among vehicles has to be done very quickly to meet the urgency requirement. In addition, the vehicle communication environment is often changing fast. A communication link is inherently short-lived. Generally speaking, this requires a fast session setup procedure for a local service. In addition, messages may have to be broadcasted to multiple vehicles in the same local area.

FIG. 1 illustrates a local area V2V communication scenario in LTE network. In this scenario, on one side, vehicles can communicate with other terminals such as other vehicles and other service providers using cellular mode. Each communication in the cellular mode is performed via a base station such as an eNodeB. In particular, call control is performed to some extent by the network represented at least by the base station. On the other side, the vehicles can communicate with other vehicles in the V2V mode. When working in V2V mode, the vehicle may communicate directly with other vehicles (in particular those in the proximity of it), without involving the base station in the communication. In particular, call control is performed by the vehicles themselves. FIG. 1 illustrates communicating in the cellular mode (via eNodeB) as well as communicating in the V2V mode (directly between vehicles).

Two general situations exist for engaging vehicle-to-vehicle (V2V) communication in a local service.

The first situation is that one vehicle, as a service provider, wants to provide services to surrounding vehicles, e.g. providing safety warning messages like lane change, overtaking, incident alerts or stop sign notification to avoid potential risks. As required by many scenarios in vehicular applications, a vehicle needs to transmit short messages to vehicles nearby within a very short time interval, or require subsequent active responses in some instances, e.g. confirming receiving message and performing corresponding actions.

The other situation is that one vehicle wants to join in a local service as a service user. Typical applications may include receiving messages of traffic status, intersection collision warning, or overtaking warnings from vehicles nearby.

In the above scenarios, the existing LTE D2D methods for session setup are not appropriate due to long latency caused by complicated service session setup procedures.

In IEEE 1609 series standard, WAVE short message (WSM) provides an always-on mechanism for the fast service request and response required by V2V applications and services. WAVE devices can exchange information directly by WSM without the overhead of IP or management associated with initiating a WAVE basic service set.

On the other hand, a service provider vehicle can use a dedicated CCH channel to advertise the availability of a service. On the CCH channel, the provider vehicle broadcasts WSM, which indicates the presence of resources associated with the services and applications. The service user vehicles monitor the CCH and decide whether to join in the service based on the received WSM advertisement.

For V2V communication applications using a cellular related technology, e.g. LTE D2D, the main obstacle lies in the complicated process for V2V link setup, which generally cannot meet the urgent time requirement needed in many V2V services, especially safety related services.

K. Doppler studied the D2D communication under-laying a 3GPP LTE-advanced cellular network [1]. From this study, one D2D service session setup has seven steps. D2D session setup relies more on coordination from network units and not on the local area services although the method also has to use a local area measurement to initiate the session. In addition, every D2D session setup addresses only one D2D link and it is not applicable for many V2V related services which may involve multiple radio links.

US patent 2011/0098043 A1 proposes a concept of D2D registration area, which is managed by network units such as eNodeB and MME in LTE-A network. A registered device may broadcast its ID to other devices. Upon receipt of the broadcasted ID, another device can request eNodeB to establish a D2D session between these devices. An obvious difficulty of this method lies in that location-based D2D registration area update may generate a large amount of extra signaling. A device has to monitor its own location and associate with broadcasted D2D registration area. The unscheduled broadcasting from a device may cause interference to other devices nearby, which may be not interested in establishing a D2D link with it.

US 2010/0009675 discusses the setup of a D2D connection. A typical procedure for setting up a D2D link between two devices includes three steps.

The $1^{st}$ device requests eNodeB for a D2D connection with the $2^{nd}$ device ENodeB responds corresponding configuration to the $1^{st}$ and $2^{nd}$ devices The $1^{st}$ device responds to eNodeB with successful establishment of D2D link Other relevant prior art is disclosed in [4]-[9].

REFERENCES

[1] Klaus Doppler, Mika Rinne, Carl Wijting, et al., Nokia Research Center, "Device-to-device communication as an underlay to LTE-advanced networks", IEEE Communications Magazine, vol. 47, no. 12, pages 42-49 (2009).

[2] S. Eichler, "Performance evaluation of the IEEE 802.11p WAVE communication standard," VTC 2007.

[3] "DSRC Implementation Guide—A guide to users of SAE 32735 message sets over DSRC", SAE International, 2010.

[4] IEEE Trial-Use Standard for Wireless Access in Vehicular Environments (WAVE)—Multi-channel Operation, IEEE Std 1609.4™-2006

[5] Part 11: Wireless Medium Access Control (MAC) and Physical Layer Specifications, IEEE Std 802.11P™-2006

[6] Renesas Electronic website: http://am.renesas.com/edge/Vol.24/system_solution/index.jsp;

[7] Renesas Mobile website: (http://renesasmobile.com/Automotive.html).

[8] 3GPP TS36.331, "Radio Resource Control".

[9] 3GPP TS36.211, "Physical channels and modulation".

[10] 3GPP TS 36.300, "Evolved Universal Terrestrial Radio Access (E-UTRA) and Evolved Universal Terrestrial Radio Access Network (E-UTRAN); Overall description; Stage 2".

SUMMARY OF THE INVENTION

It is an object of the present invention to improve the prior art.

In particular, it is an object to deal with the latency requirements for V2V communication in an LTE network.

According to a first aspect of the invention, there is provided an apparatus, comprising assigning means adapted to assign a first direct resource of a radio interface to a first vehicle-to-vehicle service based on a resource information received from a base station in a cellular mode via a cellular resource of the radio interface, wherein, in the resource information, the first direct resource and the first vehicle-to-vehicle service are indicated as being correlated, and the first vehicle-to-vehicle service is to be used or to be provided by at least a first one of one or more vehicle devices, and wherein, in the cellular mode, a communication of the apparatus with each of the one or more vehicle devices different from the apparatus is performed via the base station; performing means adapted to perform the first vehicle-to-vehicle service via the first direct resource in a vehicle-to-vehicle mode, wherein, in the vehicle-to-vehicle mode, the communication of the apparatus with each of the one or more vehicle devices is performed directly with the respective vehicle device and does not involve the base station.

The apparatus may be a terminal such as a user equipment.

According to a second aspect of the invention, there is provided an apparatus, comprising first reserving means adapted to reserve a cellular resource of a radio interface for a communication in a cellular mode; second reserving means adapted to reserve a first direct resource of the radio interface for a first vehicle-to-vehicle service, wherein the first direct resource is different from the cellular resource, wherein the first vehicle-to-vehicle service is to be performed in a vehicle-to-vehicle mode, and the apparatus is not involved in a communication in the vehicle-to-vehicle mode; communicating means adapted to communicate, on the cellular resource in the cellular mode, a first resource information to a terminal, wherein the first resource information comprises a first resource indication of the first direct resource and a correlated first service indication of the first vehicle-to-vehicle service; suppressing means adapted to suppress communicating in the cellular mode on the first direct resource.

The apparatus may be a base station such as a NodeB or eNodeB.

According to a third aspect of the invention, there is provided a method, comprising assigning a first direct resource of a radio interface to a first vehicle-to-vehicle service based on a resource information received from a base station in a cellular mode via a cellular resource of the radio interface, wherein, in the resource information, the first direct resource and the first vehicle-to-vehicle service are indicated as being correlated, and the first vehicle-to-vehicle service is to be used or to be provided by at least a first one of one or more vehicle devices, and wherein, in the cellular mode, a communication of an apparatus performing the method with each of the one or more vehicle devices different from the apparatus is performed via the base station; performing the first vehicle-to-vehicle service via the first direct resource in a vehicle-to-vehicle mode, wherein, in the vehicle-to-vehicle mode, the communication of the apparatus with each of the one or more vehicle devices is performed directly with the respective vehicle device and does not involve the base station.

According to a fourth aspect of the invention, there is provided a method, comprising reserving a cellular resource of a radio interface for a communication in a cellular mode; reserving a first direct resource of the radio interface for a first vehicle-to-vehicle service, wherein the first direct resource is different from the cellular resource, wherein the first vehicle-to-vehicle service is to be performed in a vehicle-to-vehicle mode, and an apparatus performing the method is not involved in a communication in the vehicle-to-vehicle mode; communicating, on the cellular resource in the cellular mode, a first resource information to a terminal, wherein the first resource information comprises a first resource indication of the first direct resource and a correlated first service indication of the first vehicle-to-vehicle service; suppressing communicating in the cellular mode on the first direct resource.

The methods according to any of the third and fourth aspects may be methods of vehicle-to-vehicle communication.

According to a fifth aspect of the invention, there is provided a computer program product comprising a set of instructions which, when executed on an apparatus, is configured to cause the apparatus to carry out the method according to any one of the third and fourth aspects.

The computer program product may be embodied as a computer-readable medium.

According to a sixth aspect, there is provided an apparatus, comprising at least one processor, and at least one memory including computer program code, the at least one processor, with the at least one memory and the computer program code, being configured to cause the apparatus to at least perform a method according to any of the third and fourth aspects.

According to some embodiments of the invention, at least the following advantages are achieved:

It is provided a method and a corresponding apparatus allowing fast session setup for V2V local services in the LTE network. Latencies of less than 10 ms may be guaranteed far urgent messages. Thus, LTE V2V becomes more feasible.

LTE V2V relieves from the burden of setting up a ubiquitous network for dedicated V2V communication.

In detail, by pre-configured LAB channels dedicated for V2V services, vehicles can initiate sessions quickly without requesting resources in real time or waiting for resources allocation from eNodeB. The service initiation does not depend on a determination from the network and happens locally.

LAB channels may be reused among vehicles groups in different local areas covered by one eNodeB. Compared to WAVE, the delivery range for urgent messages may be enlarged or shrunk, depending on the needs.

A vehicle may further expedite the service session setup when maintaining a copy of the active V2V services list and profiles in its local storage For the LTE network side, the following advantages may be achieved, such as:

Increase the system capacity by resource sharing with traditional cellular communication;

Reduce the load of network infrastructure, e.g. eNodeB;

Increase the spectrum efficiency by only one direct link, i.e. without any intermediate devices or procedures.

In detail, eNodeB may dynamically allocate radio resources for local V2V services according to its system load, request from vehicles, and/or active service types.

Only minor changes may be required to the present LTE protocol, and the solution may be backwards compatible.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 10 shows an apparatus according to an embodiment of the invention;

FIG. 11 shows a method according to an embodiment of the invention;

FIG. 12 shows an apparatus according to an embodiment of the invention; and

FIG. 13 shows a method according to an embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

In order to achieve the fast request and response required in many V2V communication services, especially in safety related applications, a fast setup method and a corresponding apparatus for V2V local services based on LTE network are provided.

The method may include, as a first step:
eNodeB reserves radio resources specifically for local V2V services and communicates the active V2V services list and profiles to vehicles. Typically, this information is broadcast but it may be provided dedicatedly to the vehicles (more in detail: to the terminal attached to the vehicle), e.g. during handover or when the terminal is switched on.

The profiles may include configurations in time and frequency domains like timeslots, carrier frequency and bandwidth and other QoS parameters like transmission power limit.

In some embodiments, eNodeB may dynamically configure more channels or expand/shrink/eliminate the existing channels within the allocated resources for V2V communication services according to the requests from vehicles, its system load, and/or the types of active services.

A vehicle may determine the corresponding local area broadcasting channel for a service it is interested in according to the broadcasted information from eNodeB. Then, it may start the V2V communication service directly on the local area broadcasting channel.

The local area broadcasting channel is dedicated to V2V services among vehicles. When a new service type is required, a vehicle may request new local area broadcasting channels from eNodeB. A vehicle may also request extra local area broadcasting channels for an existing service type when lots of collisions happen. By maintaining a copy of current V2V services profiles in its local storage, a vehicle may further speed up the service setup without waiting for the resources allocation from eNodeB or measuring channels to determine the reasonability of V2V communication.

Figure 1:
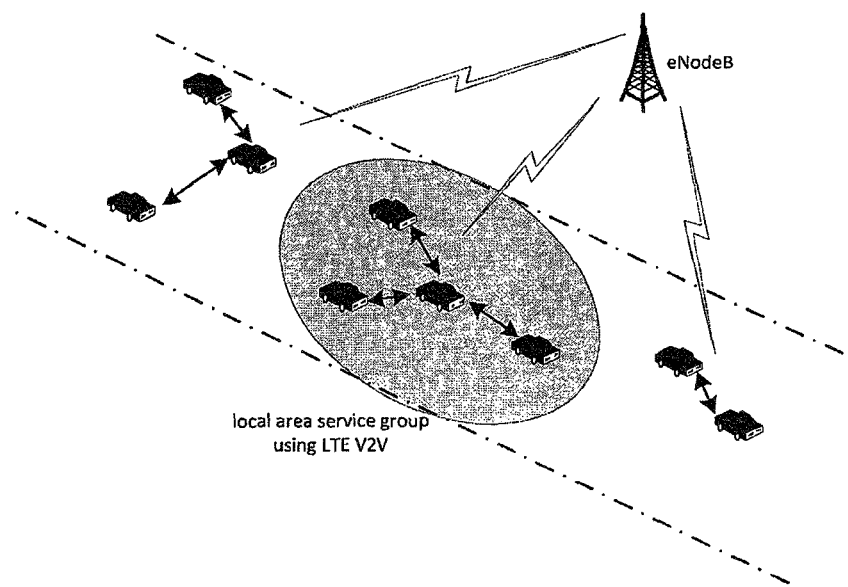
FIG. 1 illustrates a local area V2V communication scenario in an LTE network.
Figure 2:
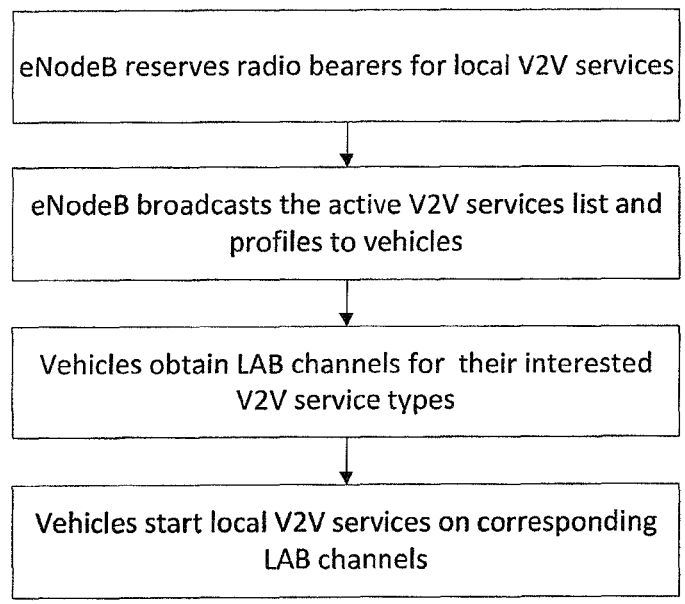
FIG. 2 shows a basic flow for providing local V2V service in an LTE network according to an embodiment of the invention.

A basic flow of a method according to embodiments of the invention is illustrated in FIG. 2. The method may be implemented in an LTE network.

According to embodiments of the invention, a vehicle can work in two working modes, namely, vehicle-to-vehicle (V2V) mode and cellular mode. The two working modes may share the same radio interface (e.g. LTE radio interface). In the cellular mode, a vehicle can communicate via eNodeB. In the V2V mode, a vehicle can communicate directly with other vehicles or roadside equipment in the local area.

In the following, reference is made to the communication with other vehicles, but embodiments of the invention may apply to roadside equipment such as traffic signs, traffic lights, stationary detectors etc. instead. That is, embodiments of the invention may comprise one or more of communication between vehicles (or their respective terminals), communication between vehicle(s) and roadside equipment(s) (or their respective terminals), and communication between roadside equipments (or their respective terminals). In addition, embodiments of the invention may be applied to other devices capable of a V2V mode and cellular mode according to embodiments of the invention, such as terminals (UEs) of pedestrians. In fact, embodiments of the invention may be applied everywhere where the corresponding terminals are capable of the V2V and cellular modes, in particular where a fast startup of a service between the terminals is required.

An eNodeB may reserve dedicated radio bearers for V2V local area services (LASs) among vehicles. In the following, reference is made to radio bearers, but in general, eNodeB may reserve resources such as radio bearers, time slots, subframes, symbols, or a combination thereof, such as a channel. An example of a reserved channel is given further below.

eNodeB may maintain a mapping table between active V2V service types and local area broadcasting (LAB) channels. All active LAB channels constitute the reserved radio bearers for V2V LASs. The active LAB channels can be dynamically configured by eNodeB according to at least one of its current system load, the LAB channel requests from vehicles, and the priority of LAS service types.

In cellular mode, according to some embodiments, an eNodeB may regularly broadcast LAB channels information for V2V LASs. According to further embodiments, the eNodeB may broadcast LAB channel information if its content is changed. This may happen in addition to regularly broadcasting. The LAB channels information may include the active LAS list and the profiles in time and frequency domains like timeslots, carrier frequency and bandwidth, and other QOS parameters like transmission power limit.

From the broadcasted information, a vehicle according to embodiments of the invention may obtain the corresponding LAB channels of the service types it is interested in, either acting as a service provider or a service user. When there is no LAB channel available for a new service type or an existing service type due to collisions, the vehicle may request eNodeB for new LAB channels configuration. Then, according to embodiments of the invention, eNodeB may use this kind of requests to dynamically configure radio bearers for V2V LASs.

In the V2V mode, a vehicle according to embodiments of the invention may play either of two roles in a LAS, a service provider or a service user. No matter what role is played, a vehicle can determine the LAB channel matching its service type according to LAB channels information from eNodeB. Being a service provider, a vehicle may start the V2V LAS on the LAB channel immediately or after some delay. Being a service user, a vehicle may monitor the potential service on the corresponding LAB channel.

This V2V communication may be limited to a local area by using appropriate transmission power control. ENodeB may give the maximum power limit for V2V mode e.g. in LAB channels information or in a separate message. So a LAB channel can be reused in different local areas covered by the same eNodeB. Note that a local area as used herein is different from and typically smaller than a local area (LA) of the LTE network.

Figure 3:
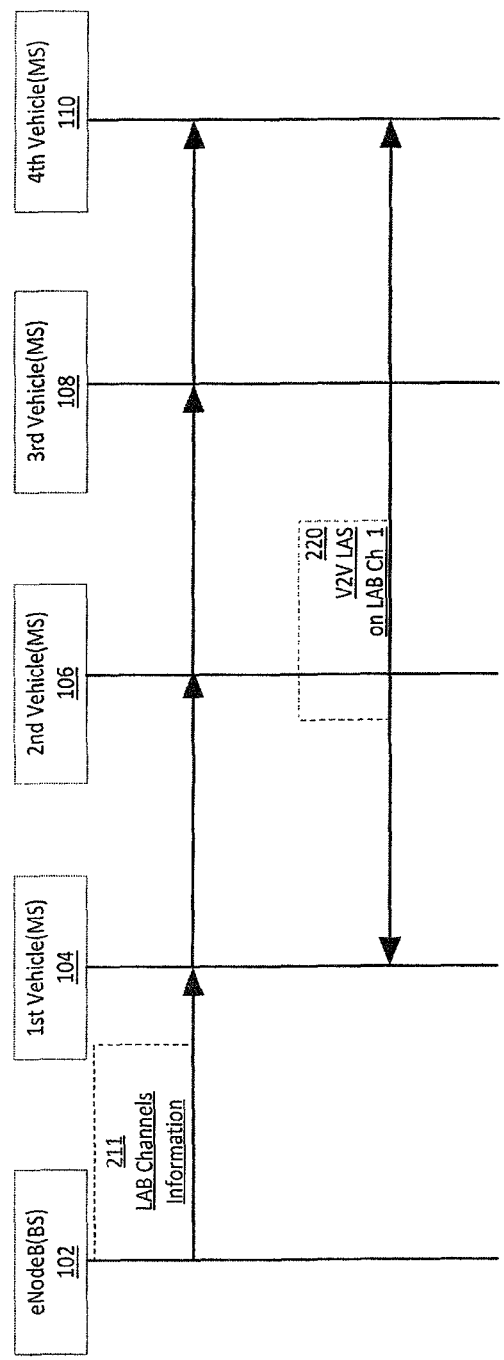
FIG. 3 illustrates a signaling flow of a LAS session setup among eNodeB and corresponding vehicles according to an embodiment of the invention.

FIG. 3 illustrates the signaling flow of a LAS session setup among eNodeB and corresponding vehicles. In this example, there are 4 vehicles in total covered by eNodeB. Three of them, vehicles 104, 106 and 110 are in the same local, which can reach each other by V2V communication mode. Vehicle 106 wants to initiate a safety alerting service as a service provider. Vehicles 104 and 110 can both hear the LAS information on the corresponding LAB channel, but vehicle 108 cannot, e.g. because it is out of reach from vehicle 106.

It is assumed that the eNodeB has reserved 4 LAB channels for current active V2V LASs. For example, 4 LAB channels of each 5 MHz are allocated to a total 20 MHz band. Table 1 illustrates potential mapping relations between active service types and corresponding LAB channels.

As illustrated in this example, LAB Ch_1 is used for safety alerting services among vehicles, which may include services like collision warning or potential risk notification. In addition, a priority level may also be specified for each service type. For example, safety alerting service may be given the highest priority (priority 1 in the example).

TABLE 1

Mapping relations between LAB channels and service types

| LAB Channel ID | V2V LAS Service type | Priority |
| --- | --- | --- |
| LAB Ch_1 | LAS_1: safety alerting | 1 |
| LAB Ch_2 | LAS_2: assistant driving | 2 |
| LAB Ch_3 | LAS_3: traffic notifying | 3 |
| LAB Ch_4 | LAS_4: entertainment | 4 |

According to embodiments of the invention, steps to set up the V2V LAS session among vehicles 104, 106 and 110 may be as follows (see FIG. 3):

Step 1: all vehicles start from the cellular mode. They receive the LAB channels information 211 from the corresponding eNodeB 102.

By receiving the LAB channels information, all vehicles can determine the corresponding LAB channels respectively according to their LAS service types each of them is interested in. In this example, vehicle 106 decides to use LAB ch_1 to provide a safety alerting service to surrounding vehicles. Vehicles 104, 108 and 110 may try to monitor the safety alerting service on LAB ch_1.

Step 2: as a service provider, vehicle 106 sets up a V2V LAS session on LAB Ch_1

Vehicles 104 and 110 can both receive data service on LAB Ch_1 from vehicle 106, but vehicle 108 cannot get the service because it is in a different local area.

Figure 4:
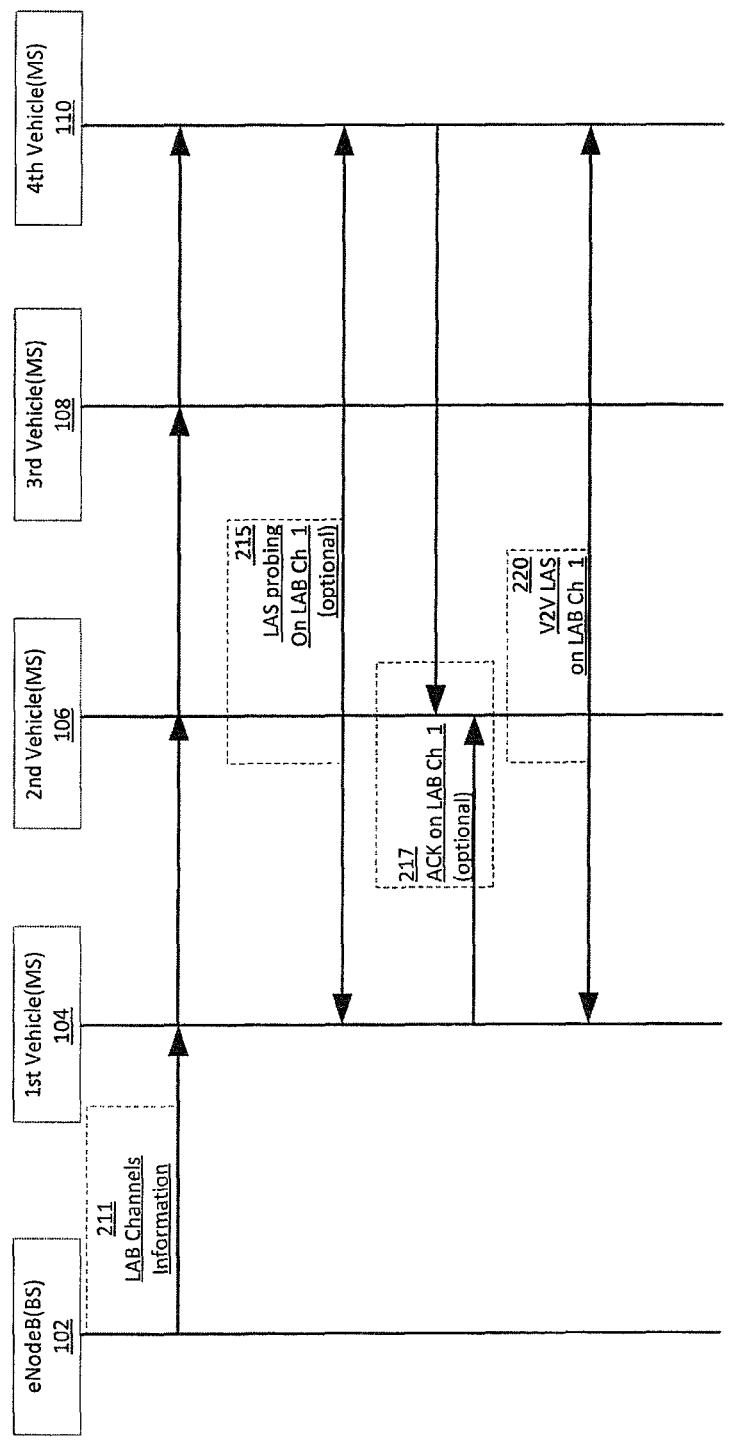
FIG. 4 illustrates another signaling flow of a LAS session setup among eNodeB and corresponding vehicles according to an embodiment of the invention.

In some embodiments of the invention, a probing procedure may be used to discover the vehicles nearby to avoid invalid LAS, especially when the service may continue for a period of time. FIG. 4 illustrates this kind of situation. Before the LAS is started, two more steps are performed when compared with the flow shown in FIG. 3. These steps are:

The $2^{nd}$ vehicle 106 initiates a LAS notification 215 on the LAB Ch_1 to discover the corresponding vehicles.

In order to set up LAS, a probing message may be firstly used to determine the vehicles nearby so as to avoid the situation with no service user vehicles around.

Service-interested vehicle 104 and 110 respond to vehicle 106 with acknowledgement (ACK) on LAB Ch_1

Both vehicles 104 and 110 may respond with ACK immediately to notify vehicle 106 that there is a vehicle interested in the service. Potential ACK collisions on the LAB Ch_1 may be mitigated by using a carrier sense multiple accesses (CSMA) method. Though, collision avoidance is not mandatory. When vehicle 106 receives at least one ACK, no matter from vehicle 104 or 110, it will go on providing its LAS on LAB Ch_1.

It may happen that no vehicle responds to a service provider vehicle. There may be no vehicles nearby or no vehicles interested in the provided LAS. Then the following steps won't go on and the LAS session won't be set up.

However, with regards to many time-critical applications in vehicular environment like safety related services, priority may be given to transmitting a message to surrounding vehicles as fast as possible. Then, at least for the time critical services, probing may not be performed. The ACK message is only to avoid a situation with no service user vehicles around, especially when the service needs a not negligible period of time for transmission.

In some embodiments of the invention, it may happen that multiple vehicles in the same local area initiate a service on the same LAB channel. Then, a collision may happen. To avoid potential collision, a kind of carrier sense multiple access (CSMA) may be used (e.g. Carrier sense multiple access with collision detection (CSMA/CD), Carrier sense multiple access with collision avoidance (CSMA/CA), or Virtual Time CSMA (VTCSMA).

In addition, an eNodeB may dynamically allocate more LAB channels for a service type to eliminate excessive collisions, as will be explained below.

When a vehicle according to embodiments of the invention cannot initiate a service, it may send LAB channels request to eNodeB. There are two types of LAB channel requests, A vehicle may request a new LAB channel for a new service type if it is not activated in the current profile A vehicle may request a new LAB channel for an existing V2V service for which a LAB channel quality deteriorates, for example, when excessive collision are experienced.

In response to the LAB channel requests from vehicles, considering e.g. the current system load and/or the active service types, an eNodeB according to embodiments of the invention may dynamically configure LAB channels using for example at least one of the following methods:

ENodeB may allocate a new LAB channel for a new service which is not activated yet in the profile list when its system load allows for it;

ENodeB may allocate new channels for active services if more traffic for that service is needed;

ENodeB may expand the resource allocation for an existing service if more traffic for that service is needed;

ENodeB may shrink or release the resource allocation for a dying service, that is, for a service that is not frequently used;

ENodeB may redistribute the resource allocation from one service to another service, e.g. from a low priority service to a high priority service.

Thus, an eNodeB according to some embodiments of the invention may dynamically configure more channels or expand/shrink/eliminate the existing channels within the allocated bandwidth for V2V communication.

Figure 5:
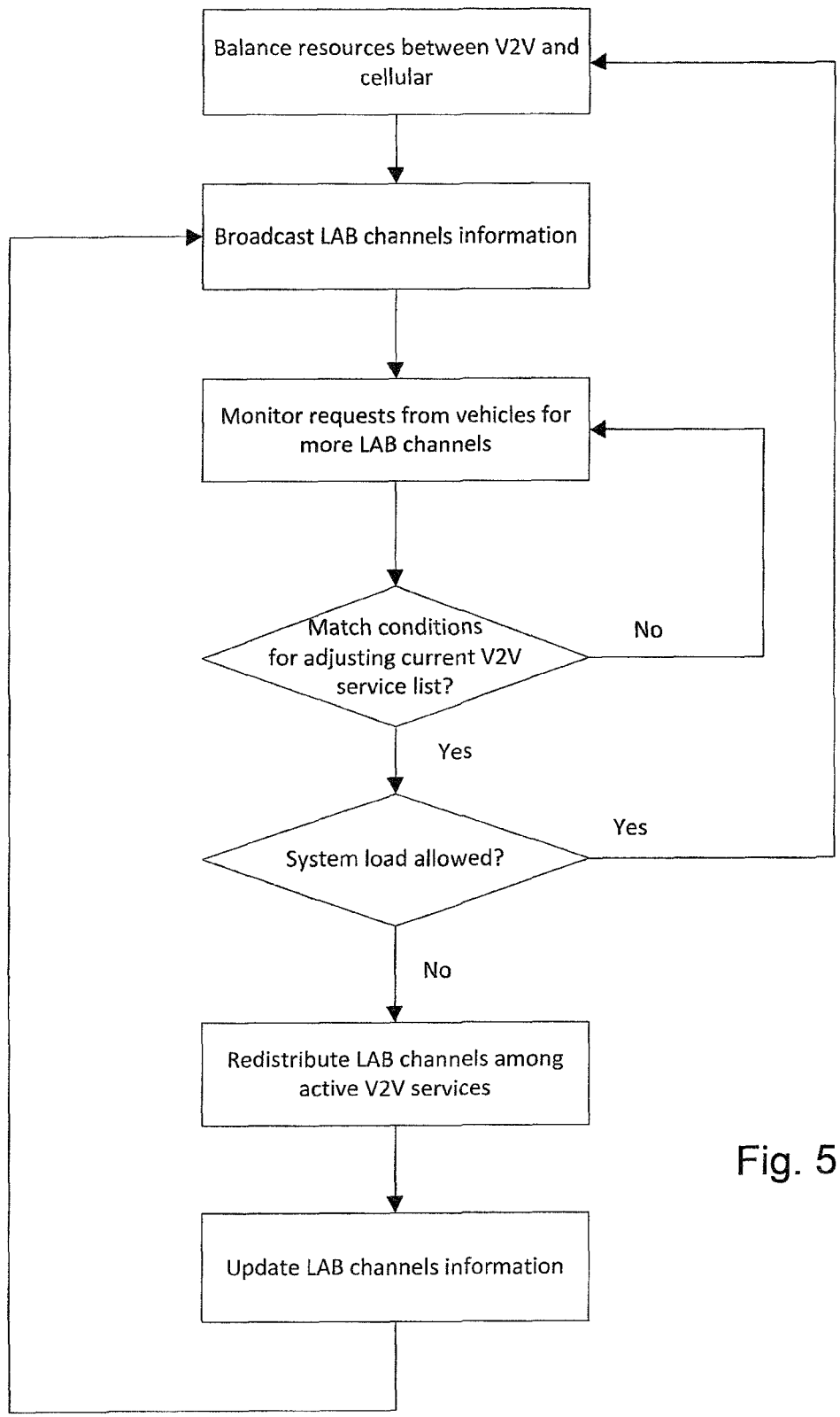
FIG. 5 illustrates a dynamic allocation procedure for LAB channels on the side of an eNodeB according to some embodiments of the invention.

FIG. 5 illustrates a dynamic allocation procedure for LAB channels on the side of an eNodeB according to an embodiment of the invention. ENodeB may balance radio resources between cellular and V2V mode. When receiving LAB channel request, eNodeB may check some conditions to determine whether these requests are considered to be sufficient to activate an adjusting of the current active V2V services. The checking conditions may include, for example, Vehicles request more LAB channels for LAS with high priority level;

Vehicles generate the request during the rush hour of traffic;

The requesting times are accumulated to a maximum number in a given period.

When eNodeB finally decides to assign some LAB channels to a new or an existing service type, it may allocate new LAB channels to them, in particular if it has light load. ENodeB may also redistribute the LAB channels for low priority services to those services with high priority level when it is overloaded.

Table 2 shows a result of a dynamic configuration of LAB channels based on the initial configurations aforementioned in table 1. In this example, eNodeB may have light load or may not consider its total load/load for cellular mode. So a new LAB channel ch_5 is allocated to safety alerting service, which has a high priority.

TABLE 2

Adding new LAB channels for V2V services

| LAB Channel ID | V2V LAS Service type | Priority |
| --- | --- | --- |
| LAB Ch_1 | LAS_1: safety alerting | 1 |
| LAB Ch_2 | LAS_2: assistant driving | 2 |
| LAB Ch_3 | LAS_3: traffic notifying | 3 |
| LAB Ch_4 | LAS_4: entertainment | 4 |
| LAB Ch_5 | LAS_1: safety alerting | 1 |

Table 3 shows a result of a dynamic configuration of LAB channels based on the initial configurations aforementioned in table 1. In this example, eNodeB is overloaded. So, one or more channels reserved for V2V communication may be reassigned to cellular communication. In the example, the LAB ch_4 for low priority service, namely entertainment service, is deleted form the list of V2V channels. In addition, in order to meet the needs for high priority service, the LAB ch_3 previously for traffic notifying service is assigned to safety alerting service.

TABLE 3

Reducing LAB channels for V2V services

| LAB Channel ID | V2V LAS Service type | Priority |
| --- | --- | --- |
| LAB Ch_1 | LAS_1: safety alerting | 1 |
| LAB Ch_2 | LAS_2: assistant driving | 2 |
| LAB Ch_3 | LAS_1: safety alerting | 1 |

Figure 6:
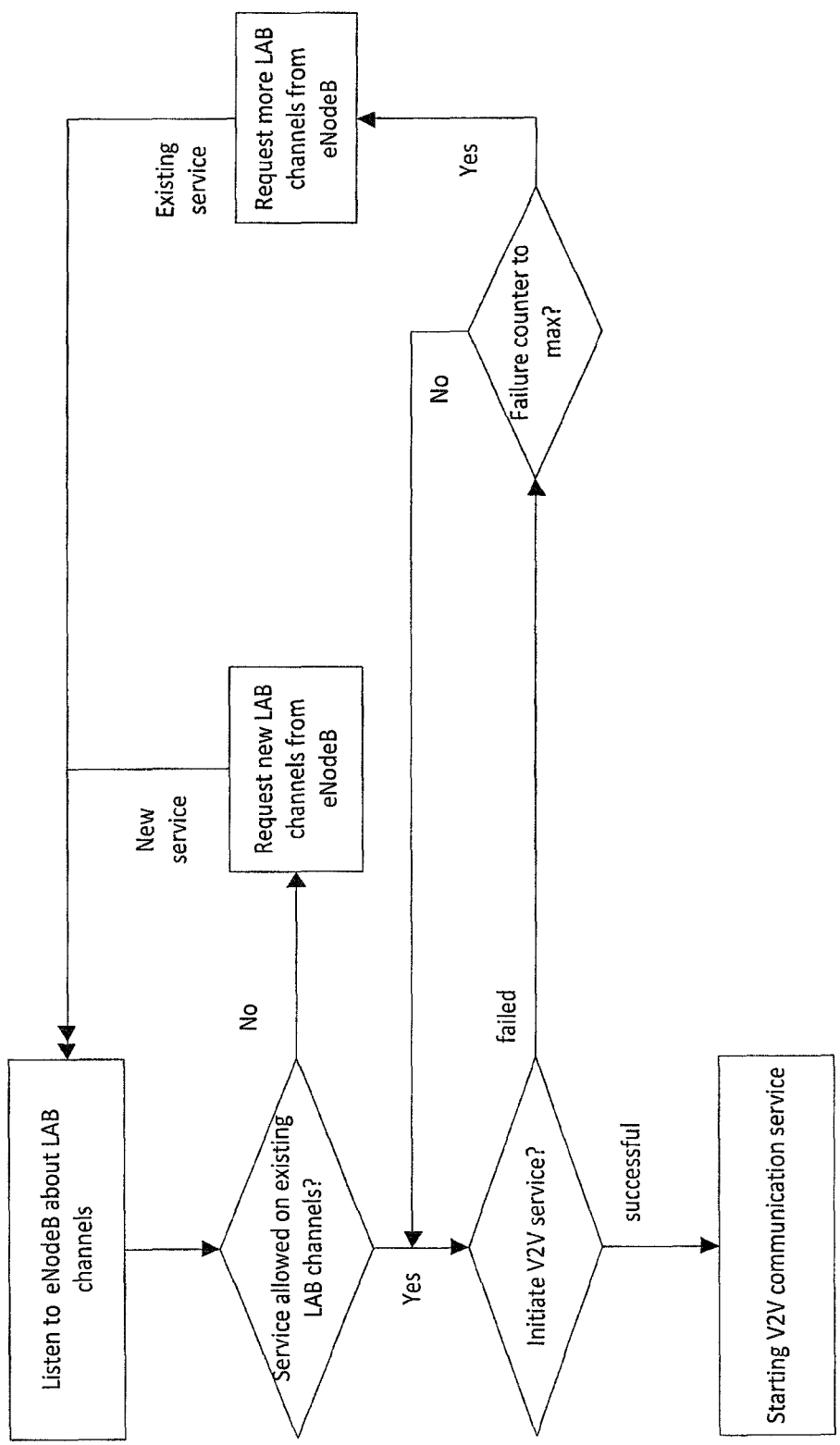
FIG. 6 illustrates a basic flow on the side of a vehicle according to some embodiments of the invention.

FIG. 6 illustrates a basic flow on the side of a vehicle according to some embodiments of the invention. When there is no LAB channel available for a new service type, the vehicle may request eNodeB for new LAB channels configuration. When a vehicle fails to initiate a V2V service on an existing LAB channel for a maximum number of times, it may request eNodeB for more LAB channels allocation to a service it is interested in.

In order to speed up the service session setup, a vehicle according to embodiments of the invention may maintain LAB channels information in its local storage. When a service should be started or used, it can obtain the corresponding LAB channel by searching in local storage. If eNodeB updates LAB channels information, the vehicle may update its own storage accordingly.

In the following, a specific implementation example according to embodiments of the invention is described. Therein, a new channel (referred to as physical urgent-broadcasting channel, PUBCH) is defined for urgent message delivery with slot division inside a subframe. In LTE, for example, eNodeB may specify the configuration of PUBCH in SIB.

The priority of a service may be mapped to a corresponding preamble. E.g., when an urgent event occurs (high priority service), the owner vehicle transmits the corresponding preamble in the urgent-broadcasting channel, and the nearby surrounding vehicles may receive that message and may react correspondingly.

In some embodiments, a message-type-based slot allocation method is used for urgent message delivery to avoid accidents or other discomfort caused by message missing due to simultaneous preamble transmissions at nearby vehicles.

In V2V safety applications, there are many kinds of urgent events, e.g.:

collision warnings;
Lane change assistance;
Overtaking vehicle warning;
Pre-crash warning;
Emergency vehicle warning;
Traffic conditions warning;
Signal violation warning;
Control loss warning.

However, in terms of the expected reactive actions at the other vehicles, only several reactions need to be defined after a safety-related event occurs. These reactions are for example:

Fast brake
Slow down
Turn to other directions

Hence, only about 3 reactive actions are needed to be delivered by urgent messages between the nearby vehicles. To make sure the successful receptions of them, it is proposed to map each reaction to one or multiple preambles, and a vehicle will send a corresponding preamble when a reaction is expected at the nearby vehicles (after the occurrence of a safety event). Then, the vehicles near the transmitter can hear the message and perform the expected reaction. A mapping example is shown in Table 4, where different preambles (denoted by 'Si') are utilized to trigger the expected reactions for vehicles with different driving directions. Such kind of mapping may be static at the network level without any difference between different cells, or may be different for different cells. In this case, the mapping has to be communicated to the vehicles at start up/handover.

TABLE 4

An example of reactive-action-mapping table with direction indications

| Reactive Actions | Applied Driving Directions | Representing Preamble |
| --- | --- | --- |
| Fast brake | From north to south | S1 |
| | From south to north | S2 |
| | From east to west | S3 |
| | From west to east | S4 |
| | all directions | S5 |
| Slow down | From north to south | S6 |
| | From south to north | S7 |
| | From east to west | S8 |
| | From west to east | S9 |
| | all directions | S10 |
| Turn to other directions | From north to south | S11 |
| | From south to north | S12 |
| | From east to west | S13 |
| | From west to east | S14 |
| | all directions | S15 |
| ... | ... | ... |

After mapping the reactions to different preambles, the preambles may be transmitted in the newly defined channel, referred to as physical urgent-broadcasting channel (PUBCH). Preferably, all vehicles are required to monitor that channel during driving. The operation mode of this new channel is similar to physical random access channel (PRACH), and its configuration can be specified in a similar way in RadioResourceConfigCommonSIB of SystemInformationBlockType2 in a LTE system [8], as shown in table 5. Therein, the new information elements are underlined.

TABLE 5

PUBCH configuration in SIB

| RadioResourceConfigCommonSIB ::= | SEQUENCE { |
| --- | --- |
| rach-ConfigCommon | RACH-ConfigCommon, |
| bcch-Config | BCCH-Config, |
| pcch-Config | PCCH-Config, |
| prach-Config | PRACH-ConfigSIB, |
| pubch-Config | PUBCH-ConfigSIB, |
| pdsch-ConfigCommon | PDSCH-ConfigCommon, |
| pusch-ConfigCommon | PUSCH-ConfigCommon, |
| pucch-ConfigCommon | PUCCH-ConfigCommon, |
| soundingRS-UL-ConfigCommon | SoundingRS-UL-ConfigCommon, |
| uplinkPowerControlCommon | UplinkPowerControlCommon, |
| ul-CyclicPrefixLength | UL-CyclicPrefixLength, |
| ..., | |
| [[ uplinkPowerControlCommon-v10x0 | UplinkPowerControlCommon-v10x0 |
| | OPTIONAL -- Need OR |
| ]] | |
| } | |
| PUBCH-ConfigSIB ::= | SEQUENCE { |
| ubch-ConfigIndex | INTEGER (0..63), |
| ubch-FreqOffset | INTEGER (0..94) |
| } | |

The relation between PUBCH-ConfigIndex and the corresponding resource allocation may also be similar as that in PRACH, and an example for it is shown in Table 6:

TABLE 6

An example of resource allocation for different PUBCH configuration index

| PUBCH Configuration Index | Preamble Format | System frame number | Subframe number |
| --- | --- | --- | --- |
| 0 | 4 | Any | 1 |
| 1 | 4 | Any | 4 |
| 2 | 4 | Any | 7 |
| 3 | 0 | Any | 1, 4, 7 |
| 4 | 0 | Any | 2, 5, 8 |
| ... | ... | ... | ... |

Figure 7:
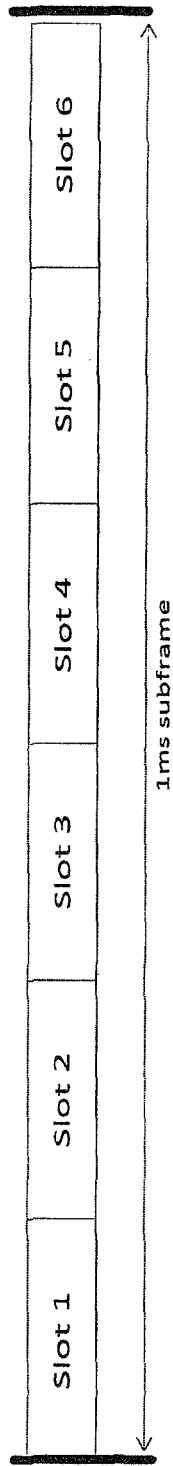
FIG. 7 illustrates a subframe division example in PUBCH for short preamble in format 4 according to some embodiments of the invention.

If the same preamble format is used as in PRACH, a preamble in Format 4 is very short whose length is about 150 μs [9]. Hence multiple transmission chances can be arranged in one subframe. A detailed arrangement example is shown in FIG. 7, where the whole subframe is divided into 6 slots and a preamble with Format 4 can be sent in any one of them. Because all vehicles have already got synchronized with a same eNodeB, preamble transmission and receiving between two nearby vehicles can be considered as almost synchronized. For example, for two vehicles with a distance of 600 meters, the propagation delay between them is only 2 μs which is much smaller than the cyclic prefix part of the Format-4 preamble (whose length is about 15 μs). Also, long preamble format with larger cyclic prefix (for example Format 0) may also be applied.

In order to make the communication more reliable, a longer preamble format may be used, or the preamble may be repeatedly transmitted. Furthermore, it is noted that a preamble is generally detected by a correlator, and hence, the error rate at the receiving vehicle is relatively low.

In some embodiments, PUBCH may be allocated at the same place in time domain as PRACH, with a fixed frequency offset to it. In this case, only a frequency offset is required to be specified for PUBCH.

When multiple vehicles in a same local area have urgent messages to send, two or more of the nearby vehicles may try to send preambles in a same slot. In this case, they cannot hear each other and some expected reactions for safety purpose cannot be received.

When the expected reactions are the same, such kind of message missing does not cause a problem because the message senders have already performed that reaction. For example, when a vehicle finds a collision, it will perform 'fast brake' and send an urgent message notifying nearby vehicles to 'fast brake' as well.

However, when the missing messages contain different reactions, some problem may occur. For example, when vehicle A is sending a 'fast brake' message and another vehicle B following the same direction is sending a 'slow down' message simultaneously, vehicle B can have a head-on collision because the vehicle right before B will perform a 'fast brake' action after receiving A's message while B does not know about it.

Figure 8:
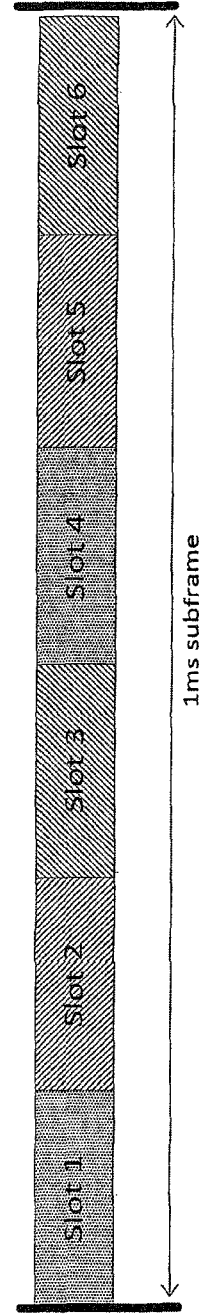
FIG. 8 illustrates a slot allocation example in PUBCH based on message type according to some embodiments of the invention.

In order to overcome this problem, according to some embodiments of the invention, the PUBCH slots in each frame may be classified according to message types. For example, the first PUBCH slot in a frame will be allocated to 'fast brake' message, the second one be allocated to 'slow down' message, and the third slot be allocated to 'turn to other direction' message, etc. An example for such an allocation is shown in FIG. 8. In these embodiments, only the same type of urgent reactions will be transmitted in a same PUBCH slot, and vehicles who cannot hear each other due to simultaneous preamble transmissions will not affect other's safety any more. It should be noted that such kind of slot allocation may be specified by default, or configured dynamically and notified by eNB, typically by broadcasting.

In some embodiments of the invention, the indication of the resource for V2V services may be encrypted. An UE may be notified of the decryption key only after its authentication, e.g. according to LTE standard [10]. In detail, in some embodiments, the key may be used to decrypt the information about the physical-layer urgent-broadcasting channel, such as the resource allocation for the channel, preamble groups used by it, etc. Hence, only when a UE has the key, it can decode the eNB-broadcast information about the allocated resource, and then use it. Preferably, the key is not used to encrypt and decrypt the preamble itself in order to avoid a larger latency time.

Figure 9:
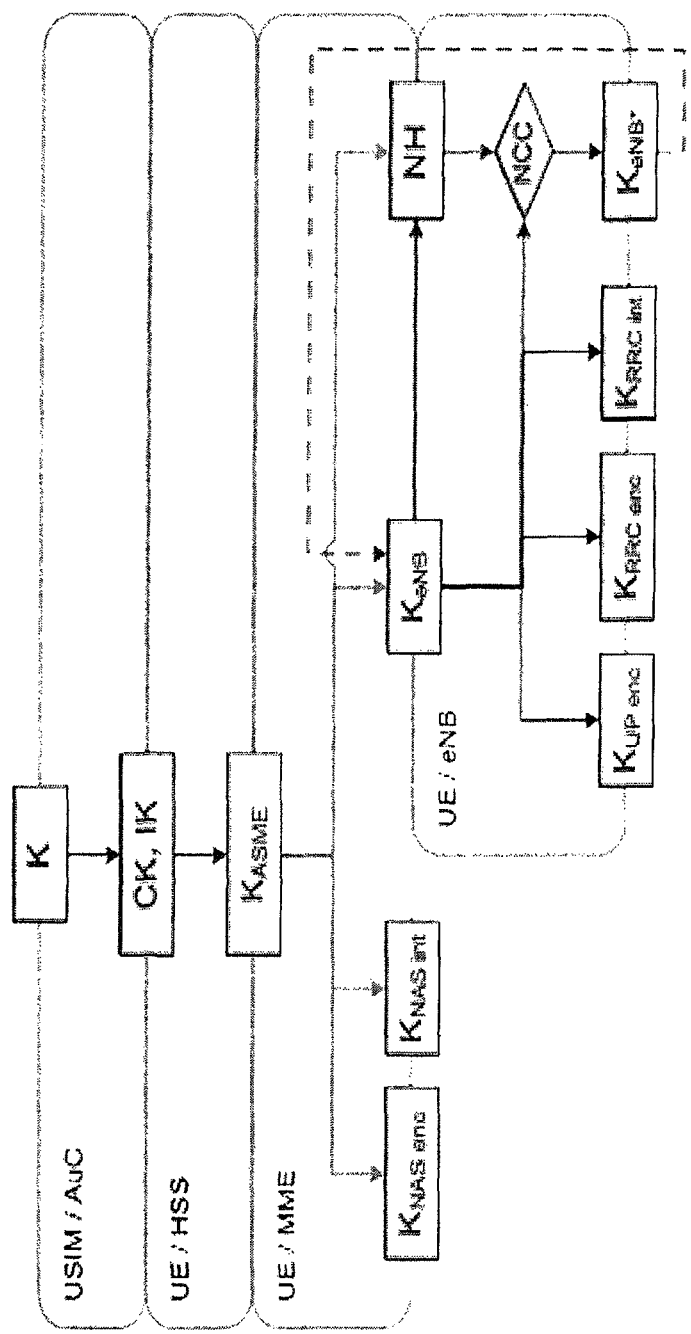
FIG. 9 shows an authentication method according to [10]

In LTE, authentication is performed by MME based on USIM [10]. Therein, some encryption keys are exchanged and secure control and data links are finally set up. Details are shown in FIG. 9 taken from [10], section 14.

The decryption key used for decrypting the encrypted resource indication for V2V services may be notified by e.g. a new unicast RRC message, which may be encrypted by the RRC-related keys.

By the encryption, it may be avoided that unauthorized terminals may send V2V service message which potentially might result in traffic chaos.

FIG. 10 shows an apparatus according to an embodiment of the invention. The apparatus may be a terminal such as a UE or another terminal installed in or attached to a vehicle, or a part thereof. The apparatus comprises at least one processor 10, and at least one memory 20 including computer program code, wherein the at least one processor 10, with the at least one memory 20 and the computer program code, being configured to cause the apparatus to at least perform one of the methods shown in FIG. 11.

FIG. 11 shows a method according to an embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

According to step S10, a direct resource of a radio interface is assigned to a vehicle-to-vehicle service. The direct resource and the vehicle-to-vehicle service and their correlation to each other are indicated in a resource information received from a base station, and the assigning is based on the resource information. More in detail, the resource information is received from the base station in a cellular mode via a cellular resource of the radio interface. The vehicle-to-vehicle service is to be used or to be provided by one or more vehicle devices. Note that, in the cellular mode, a communication of the apparatus with each of the one or more vehicle devices different from the apparatus is performed via the base station, whereas, in the vehicle-to-vehicle mode, the communication of the apparatus with each of the one or more vehicle devices is performed directly with the respective vehicle device and does not involve the base station.

According to step S20, the vehicle-to-vehicle service is performed via the direct resource in the vehicle-to-vehicle mode.

FIG. 12 shows an apparatus according to an embodiment of the invention. The apparatus may be a base station such as a NodeB or eNodeB, or a part thereof. The apparatus comprises at least one processor 50, and at least one memory 60 including computer program code, wherein the at least one processor 50, with the at least one memory 60 and the computer program code, being configured to cause the apparatus to at least perform one of the methods shown in FIG. 13.

FIG. 13 shows a method according to an embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

According to step S110, a cellular resource of a radio interface is reserved for a communication in a cellular mode. A direct resource of the radio interface is reserved for a vehicle-to-vehicle service (S120), wherein the direct resource is different from the cellular resource. The vehicle-to-vehicle service is to be performed in a vehicle-to-vehicle mode, wherein the apparatus is not involved in a communication in the vehicle-to-vehicle mode.

According to step S130, a resource information is communicated on the cellular resource in the cellular mode to a terminal. The resource information comprises a resource indication of the direct resource and a correlated service indication of the vehicle-to-vehicle service.

According to step S140, communicating in the cellular mode on the direct resource is suppressed. Thus, V2V communication in the vehicle-to-vehicle mode is separated from cellular communication in the cellular mode.

Embodiments of the invention are described based on an LTE-A system but embodiments of the invention may be applied to other radio access technologies such as LTE, WiFi, WLAN, UMTS, HSPA, if cellular communication (i.e. communication between base station and a terminal) and V2V communication are foreseen.

A terminal may be a user equipment, a mobile phone, a laptop, a smartphone, a tablet PC, or any other device that may attach to the mobile network and may perform V2V communication. A base station may be for example a NodeB, an eNodeB or any other base station of a radio network.

If not otherwise stated or otherwise made clear from the context, the statement that two entities are different means that they are differently addressed in their respective network. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a terminal apparatus such as a user equipment, a user equipment deployed in a vehicle, a user equipment deployed on roadside equipment, or a component thereof, an apparatus embodying the same, a method for controlling and/or operating the same, and computer program(s) controlling and/or operating the same as well as mediums carrying such computer program(s) and forming computer program product(s). Furthermore, it should thus be apparent that exemplary embodiments of the present invention provide, for example an a base station, or a cell of a base station, or a component thereof, an apparatus embodying the same, a method for controlling and/or operating the same, and computer program(s) controlling and/or operating the same as well as mediums carrying such computer program(s) and forming computer program product(s).

According to exemplarily embodiments of the present invention, a system may comprise any conceivable combination of the thus depicted devices/apparatuses and other network elements, which are configured to cooperate with any one of them.

In general, it is to be noted that respective functional blocks or elements according to above-described aspects can be implemented by any known means, either in hardware and/or software/firmware, respectively, if it is only adapted to perform the described functions of the respective parts. The mentioned method steps can be realized in individual functional blocks or by individual devices, or one or more of the method steps can be realized in a single functional block or by a single device.

Generally, any structural means such as a processor or other circuitry may refer to one or more of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software/firmware or by hardware without changing the idea of the present invention. Such software may be software code independent and can be specified using any known or future developed programming language, such as e.g. Java, C++, C, and Assembler, as tong as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

What is claimed is:

1. An apparatus comprising:
circuitry configured to
assign a first direct resource of a radio interface to a first vehicle-to-vehicle service associated with a priority based on a resource information received from a base station in a cellular mode via a cellular resource of the radio interface, wherein, in the resource information, the first direct resource and the first vehicle-to-vehicle service are indicated as being correlated, and the first vehicle-to-vehicle service is to be used or to be provided by at least a first one of one or more vehicle devices, and wherein, in the cellular mode, a communication of the apparatus with each of the one or more vehicle devices different from the apparatus is performed via the base station; and
perform the first vehicle-to-vehicle service via the first direct resource in a vehicle-to-vehicle mode by controlling transmission of a signal including a preamble of a predefined format corresponding to the priority, wherein, in the vehicle-to-vehicle mode, the communication of the apparatus with each of the one or more vehicle devices is performed directly with the respective vehicle device and does not involve the base station, and the preamble of the predefined format identifies a physical action to be taken by a vehicle including the respective vehicle device.

2. The apparatus according to claim 1, wherein the circuitry is further configured to:
store an indication of the first direct resource and of the correlated first vehicle-to-vehicle service when the resource information is received; and
assign the first direct resource to the first vehicle-to-vehicle service based on the stored indication.

3. The apparatus according to claim 1, wherein the circuitry is further configured to:
monitor whether the first direct resource is available for a second vehicle-to vehicle service in the vehicle-to-vehicle mode, wherein the second vehicle-to-vehicle service is to be used or to be provided by a second one of the one or more vehicle devices; and request, if the first direct resource is not available for the second vehicle-to-vehicle service, a second direct resource for the second vehicle-to-vehicle service from the first base station.

4. The apparatus according to claim 3, wherein the circuitry is further configured to:
perform the monitoring such that a result of the monitoring is that the first direct resource is not available for the second vehicle-to-vehicle service if at least one of the following conditions is fulfilled:
the first direct resource is not assigned to the second vehicle-to-vehicle service; or
the first direct resource is assigned to the second vehicle-to-vehicle service but the first direct resource is busy.

5. The apparatus according to claim 1, wherein the circuitry is further configured to:
send a probing request on the first direct resource before the first vehicle-to-vehicle service is started;
monitor if an acknowledgement is received in response to the probing request;
start the first vehicle-to-vehicle service if the acknowledgement is received; and
suppress the starting of the vehicle-to-vehicle service if the acknowledgement is not received.

6. The apparatus according to claim 1, wherein
the circuitry is further configured to perform avoiding a collision by carrier sense multiple access when performing the first vehicle-to-vehicle service.

7. The apparatus according to claim 1, wherein
the first direct resource is a channel for random access,
the circuitry is further configured to control transmitting the preamble of the predefined format when the first vehicle-to-vehicle service is performed, and
the priority of the first vehicle-to-vehicle service is identified based on a message received from the base station.

8. The apparatus according to claim 1, wherein the circuitry is further configured to:
perform authenticating of the apparatus at the base station; and
decrypt at least a part of the received resource information by a decrypting a key received from the base station to obtain a decrypted indication of the first direct resource, wherein the part of the received resource information is encrypted.

9. The apparatus according to claim 1, wherein the apparatus is a user equipment.

10. An apparatus comprising:
circuitry configured to
receive, from a base station, information identifying a first direct resource of a radio interface assigned to a first vehicle-to-vehicle (V2V) service associated with a first priority and identifying a second direct resource of the radio interface assigned to a second V2V service associated with a second priority;
performing the first V2V service via the first direct resource in a V2V mode by controlling transmission of a signal including a first preamble of a first predefined format corresponding to the priority of the first V2V service; and
performing the second V2V service via the second direct resource in the V2V mode by controlling transmission of a signal including a second preamble of a second predefined format corresponding to the priority of the second V2V service,
wherein at least one of the first and second preambles identify a physical action to be taken by a vehicle receiving the at least one of the first and second preambles.

11. The apparatus of claim 10, wherein
the first direct resource is a first local area broadcast (LAB) channel, and
the second direct resource is a second LAB channel.

12. The apparatus of claim 10, wherein
the first V2V service and the second V2V service are one of a safety alerting service, an assistant driving service and an entertainment service.

13. The apparatus of claim 10, wherein
the circuitry is configured to receive the information while operating in cellular mode via a cellular resource of the radio interface.

14. The apparatus of claim 13, wherein
the circuitry is configured to perform the first and second V2V services directly with another apparatus and not via the base station.

15. The apparatus of claim 10, wherein
a plurality of events are associated with the first V2V service and each of the plurality of events are associated with a different preamble when performing the first V2V service.

16. The apparatus of claim 10, wherein the circuitry is configured to:
send a probing request on the first direct resource before the first V2V service is started;
monitor if an acknowledgement is received in response to the probing request; and
start the first V2V service if the acknowledgement is received.

17. The apparatus of claim 10, wherein
the circuitry is configured to perform collision avoidance by carrier sense multiple access when performing the first V2V service.

18. The apparatus of claim 10, wherein
the first direct resource is a channel for random access, and
the circuitry is configured to control transmitting the first preamble of the first predefined format when the first V2V service is performed.

19. The apparatus of claim 10, wherein the circuitry is configured to:
perform authenticating of the apparatus at the base station; and
decrypt at least a part of the received information by a decrypting a key received from the base station to obtain a decrypted indication of the first and second direct resources.

20. A method comprising:
receiving, from a base station, information identifying a first direct resource of a radio interface assigned to a first vehicle-to-vehicle (V2V) service associated with a first priority and identifying a second direct resource of the radio interface assigned to a second V2V service associated with a second priority;
performing the first V2V service via the first direct resource in a V2V mode by controlling transmission of a signal including a first preamble of a first predefined format corresponding to the priority of the first V2V service; and
performing the second V2V service via the second direct resource in the V2V mode by controlling transmission of a signal including a second preamble of a second predefined format corresponding to the priority of the second V2V service, wherein at least one of the first and second preambles identify a physical action to be taken by a vehicle receiving the at least one of the first and second preambles.

\* \* \* \* \*